United States Patent [19]

Deering

[11] 4,083,770
[45] Apr. 11, 1978

[54] USE OF CONTROL SYSTEM FOR GAS-SOLIDS CONTACTING PROCESSES

[75] Inventor: Roland F. Deering, Brea, Calif.

[73] Assignee: Union Oil Company of California, Los Angeles, Calif.

[21] Appl. No.: 718,785

[22] Filed: Aug. 30, 1976

[51] Int. Cl.² .................. C10B 53/06; C10G 1/02
[52] U.S. Cl. .................. 208/11 R; 34/168; 201/1; 201/23; 201/29; 201/32; 201/34; 201/37; 201/38; 23/230 A
[58] Field of Search .......... 208/11; 201/23, 29, 201/1, 21, 28, 27, 34, 38, 37, 32; 34/168; 432/215

[56] References Cited

U.S. PATENT DOCUMENTS

| | | | |
|---|---|---|---|
| 2,989,442 | 6/1961 | Dorsey | 201/39 |
| 3,001,916 | 9/1961 | Cheadle | 201/1 |
| 3,361,644 | 1/1968 | Deering | 208/11 R X |
| 3,475,319 | 10/1969 | MacLaren | 208/11 R |
| 3,573,194 | 3/1971 | Hopper | 208/11 R |
| 3,972,801 | 8/1976 | Gregoli | 208/11 R |
| 4,003,797 | 1/1977 | Cheadle et al. | 201/32 X |
| 4,004,982 | 1/1977 | Jennings et al. | 201/32 X |
| 4,010,092 | 3/1977 | Deering | 208/11 R |
| 4,025,416 | 5/1977 | Deering et al. | 201/32 |

Primary Examiner—Morris O. Wolk
Assistant Examiner—Michael S. Marcus
Attorney, Agent, or Firm—Lannas S. Henderson; Richard C. Hartman; Dean Sandford

[57] ABSTRACT

In gas-solids contacting processes involving the transfer of granular solids from a high-temperature, non-oxidizing treating zone through an enclosed conduit to a combustion zone, the transfer of gases between the treating zone and the combustion zone is prevented by using a novel steam sealing technique which avoids the use of mechanical sealing means and differential pressure controllers. Steam is injected into the system between the two contacting zones, and by the use of flow rate controllers and a pressure controller, a portion of such steam is forced at all times to flow through the combustion zone, while another portion thereof is withdrawn from the transfer conduit in admixture with a portion of net off-gas from the treating zone. The control system is particularly adapted for use in oil shale retorting, wherein coke on the retorted shale is burned in a combustion zone.

11 Claims, 1 Drawing Figure

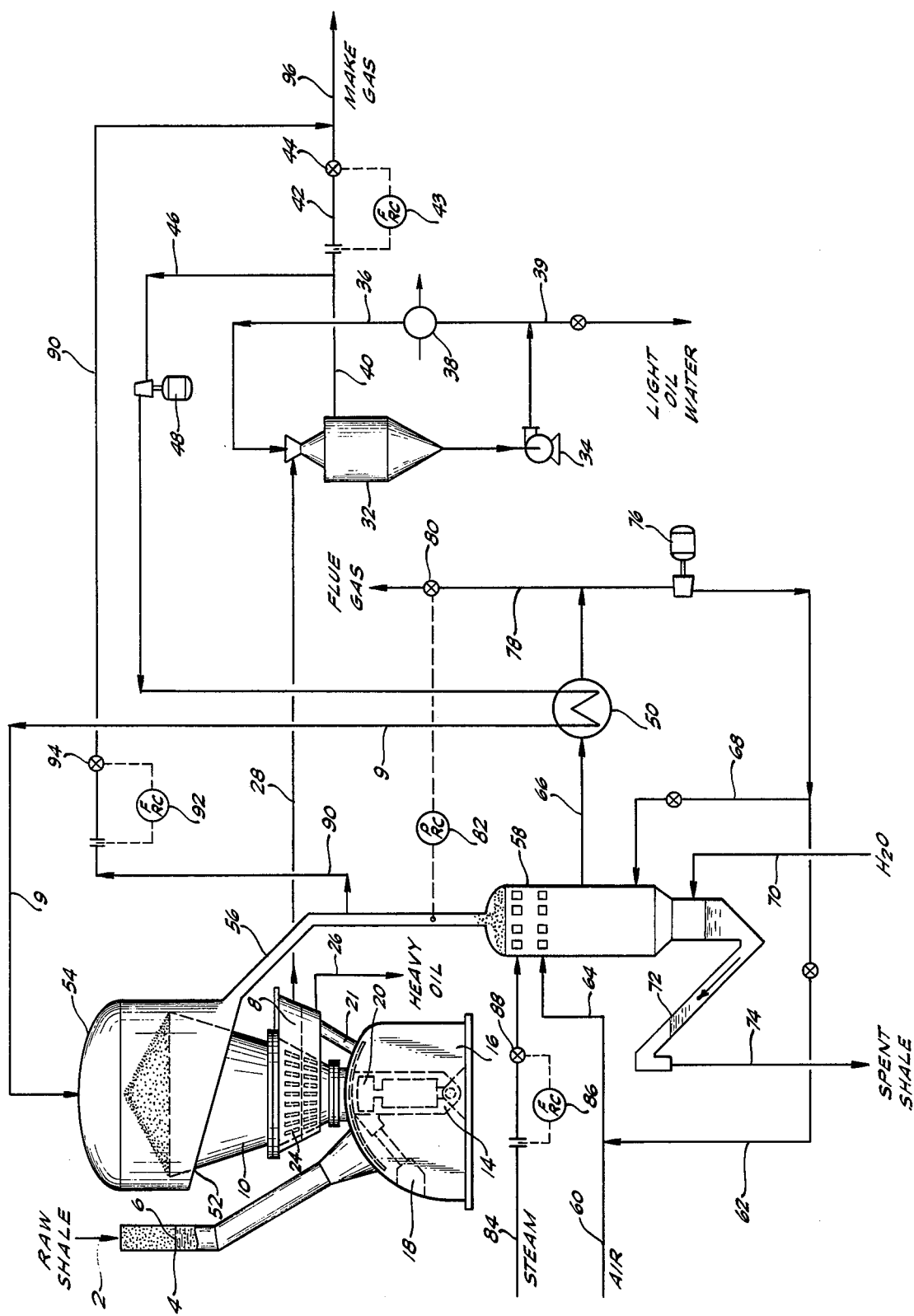

USE OF CONTROL SYSTEM FOR GAS-SOLIDS CONTACTING PROCESSES

BACKGROUND AND SUMMMARY OF INVENTION

Several areas of chemical technology involve the transfer of granular solids from a non-oxidative gas contacting zone to an oxidative gas contacting zone, while preventing the transfer of gases between the respective zones. The retorting of oil shale followed by combustion of coke on the spent shale is a prime example. Other examples include the use of moving beds of granular absorbents or catalysts to effect chemical separations or conversions, wherein more or less continuous removal of coke or other deactivating deposits from the solids is carried out by combustion. In these and other gas-solids contacting processes, one widely used method for isolating the gases in the respective contacting zones involves the use of expensive and elaborate lock vessels, valves, star feeders, slide valves and the like, through which the solids are allowed to pass while restricting the flow of gases. These devices are subject to failure through rapid wearing of moving parts, and tend to produce fines through crushing or abrading of the solids. Another method which has been utilized involves the injection of an inert sealing gas into the transfer zone between the two contacting zones, a portion of which passes through the combustion zone, and another portion through the treating zone. Conventionally, this seal gas system is controlled by differential pressure controllers, which are very sensitive and subject to upsets, especially when pressure differentials between the two contacting zones may fluctuate due to surges in gas flow rates. My control system to be described hereinafter avoids all of these major difficulties.

In the use of an inert seal gas, the difficulties involved in the use of differential pressure controllers could obviously be avoided if off-gases from the respective contacting zones could be produced at a constant rate while still maintaining constant pressures. However, in most contacting processes, including shale retorting, the rate of production of product gases in the retorting or other treating zone may vary substantially from time to time, as well as the rate of production of flue gases from the combustion zone. This renders difficult the production of off-gases from the respective contacting zones under constant flow control and pressure, while still insuring that some of the inert seal gas will at all times flow through each contacting zone. Further complications arise when the generally most desirable sealing gas, steam, it utilized. Shale retorting off-gases, as well as off-gases from many catalytic contacting processes, must be cooled to condense out liquid hydrocarbons and this also brings about condensation of steam. Constant flow control over product off-gases would thus not be responsive to steam passing through the retorting or other contacting zone. The flow control system provided herein is uniquely adapted to the use of steam as the sealing gas.

In broad aspect my control system described herein finds utility in gas-solids contacting processes wherein a moving bed of granular solids is contacted in an enclosed treating zone at elevated temperatures with a stream of non-oxidizing gas, resulting in the production of a net off-gas therefrom, the rate of production of said net off-gas varying between a maximum expected value, M, and a minimum expected value, m, and wherein solids from the treating zone are transferred through an enclosed transfer zone to an enclosed combustion zone wherein they are contacted at elevated temperatures with a stream of oxidizing gas. Briefly summarized, to prevent the transfer of gases between the treating zone and the combustion zone, the critical features of my control system are as follows:

(1) substantially constant pressures are maintained in the treating zone and combustion zone by exhausting flue gas from the combustion zone in response to pressure detected at some point in the transfer zone;

(2) a portion of the net off-gas, or make gas, generated in the treating zone is, after cooling, withdrawn from the process at a substantially constant predetermined flow rate, $x$, which is less than the value, $m$;

(3) steam is injected into a lower portion of the transfer zone at a substantially constant predetermined flow rate, $y$, which is greater than $M - m$; and (4) at some point between the treating zone and the point of steam injection at (3) above, a hot mixed gas stream is withdrawn from the transfer zone at a substantially constant, predetermined flow rate, $z$, wherein $z$ is greater than $M - x$, but less than $y + m - x$.

By operating in this manner the mixed gas stream at (4) will always comprise the net off-gas not withdrawn at step (2) above plus some steam, and some of the steam injected at step (3) will always be forced to pass through the combustion zone. As applied to shale retorting, the control scheme insures high yields of oil and a high BTU make-gas, prevents contamination of product gas with flue gas, prevents high BTU gas from the retort from entering the combustion zone, prevents air from the combustion zone from entering the retort, and maintains steady control of system pressure. The system is also unaffected by variations in pressure drop through the beds of shale in the retort and combustor.

BRIEF DESCRIPTION OF THE DRAWING

The attached drawing is a simplified flow diagram illustrating one preferred mode of applying the control system to a retorting operation.

DETAILED DESCRIPTION

Referring now to the drawing, details of the control system will be explained in connection with the specific type of shale retorting described therein. Raw shale is fed at 2 into the top of elongated feed conduit 4, and gravitates downwardly therein at a rate controlled in response to the shale feeding mechanism to be subsequently described. A liquid oil level 6 is maintained in the feed conduit by virtue of the superatmospheric pressure prevailing in product oil collection tank 8 or retort 10. Shale is transferred from the bottom of feed conduit 4 into the bottom of the retort by means of an oscillating piston pump 14 located in feeder housing 16.

Piston pump 14 oscillates between the retort feeding position shown and a feed receiving position immediately below the outlet of feed conduit 4, by means of hydraulic operating cylinder 18. In the feed receiving position, reciprocating piston 20 is retracted in order to receive a fresh charge of shale for delivery to the retort. This feeding mechanism is more particularly described in U.S. Pat. No. 2,895,884, and forms no part of the present invention. By virtue of open conduit 21 there is substantially free hydraulic communication between product collection tank 8, feeder housing 16, and feed inlet conduit 4, as a result of which the pressure in product collection tank 8 determines oil level 6, feeder housing 16 being at all times filled with oil.

After being fed into the bottom of retort 10 as described, the raw shale passes upwardly therein, traversing a lower preheating zone and an upper pyrolysis zone. Temperatures in the lower portion of the retort are sufficiently low to condense product oil vapors from the superjacent pyrolysis zone. As the shale progresses upwardly through the retort its temperature is gradually increased to eduction levels by countercurrently flowing eduction gases which include a preheated recycle portion of retort make gas from line 9. Eduction gas temperatures are conventional, ranging between about 600° and 1100° F, preferably between about 700° and 1000° F. Essentially all of the oil will have been educed from the shale by the time it reaches a temperature of about 900° F. Other retorting conditions include shale residence times in the pyrolysis zone in excess of about 10 minutes, usually about 30 minutes to 2 hours, sufficient to educe the maximum amount of oil at the selected retort temperatures. Shale feed rates usually exceed about 100, and are preferably about 1000 – 2000 pounds per hour per square foot of cross-sectional area in the retort. These values refer to average cross-sectional area in the tapered retort illustrated in the drawing.

Pressures at the top of the retort 10 may range between about −10 and 500, preferably between about 10 and 40 psig. Pressure drop through the bed of shale in the retort generally ranges between about 2–3 psi, and through the entire product recovering system between about 5–10 psi. In the retort, eduction gases and product oil flow downwardly into the cooler, condensing portion thereof, and thence into slotted, frusto-conical liquid-vapor disengagement zone 24, from which liquid product oil and vapors flow into product collection tank 8. Liquid product is withdrawn therefrom via line 26 at a rate controlled to maintain the desired liquid level in production collection tank 8. Vapor phase effluent is withdrawn from tank 8 via line 28 at a temperature of e.g., 200° – 250° F. This vapor effluent contains light hydrocarbon make gases, steam, and a mist of heavier hydrocarbons, the whole comprising usually about 20–30 percent by weight of total hydrocarbons recovered in the process.

To recover light hydrocarbons, the vapor phase effluent in line 28 is transferred to venturi scrubber 32, in which a stream of circulating oil condensate is maintained via pump 34 and line 36, the stream being cooled to e.g., 100° – 125° F by means of cooler 38. Net condensate from scrubber 32, comprising oil and water, is taken off via line 39, and passed into oil-water separator facilities not shown. Scrubbed off-gas is withdrawn from scrubber 32 via line 40. This off-gas comprises recycle gas plus the total net make gas formed in passing through the retort. The disposition of the total net make gas in line 40 is an important feature of the invention.

As previously noted, the rate of production of net make gas in the retort varies considerably from time to time, between a maximum value, M, and a minimum value, $m$. When retorting oil shale of about 30–40 gallons per ton Fischer assay, $m$ may be as low as 700 SCF/ton, and M may be as high as 900 SCF/ton, and M − $m$ is usually in excess of about 5% of $m$. In order to maintain the steam seal to be subsequently described, a constant flow of net make gas, corresponding to a portion only of the expected value of $m$, is withdrawn from the process via line 42, as determined by the setting of flow recorder controller 43 and valve 44. Preferably, the portion of net make gas withdrawn will be about 50–80% of $m$. The remainder of net make gas is passed in admixture with recycle gas through line 46, compressor 48, preheater 50 and line 9 into the top of retort 10, and is ultimately produced in the manner to be subsequently described.

The retorted shale overflowing the top of retort 10 falls onto the inclined peripheral floor 52 of shroud 54, which is affixed in fluid tight fashion to the outer wall of the retort. The retorted shale then gravitates down floor 52 through transfer conduit 56 into combustor 58. A preheated mixture of air from line 60 and recycle flue gas from line 62 is passed into the top of combustor 58 via line 64 and passes downwardly therein to effect combustion of coke, the resulting flue gas then being withdrawn via line 66. Combustion is carried out at temperatures of about 900–1700° F, utilizing about 12,000 – 24,000 SCF/ton of shale of the flue gas-air mixture. Cooling of the combusted shale is effected by means of a countercurrent stream of cooled flue gases admitted via line 68, and water admitted via line 70. The water also forms a hydrostatic seal in the bottom of combustor 58 and sealing leg 72. Spent shale is conveyed upwardly through sealing leg 72 by means of a drag chain conveyor or the like, and is discharged via line 74 at a rate controlled to maintain the desired level of shale in combustor 58.

The flue gas in line 66, after passing through heat exchanger 50, is split into recycle gases returned to the combustor via compressor 76 as previously described, and net off-gas taken off via line 78 and valve 80, controlled by pressure recorder controller 82 which is responsive to pressure detected at some point in transfer conduit 56, or at the top of retort 10, or the top portion of combustor 58. The top portion of combustor 58, above air inlet line 64 is actually a portion of the shale transfer zone.

To provide the critical steam seal between combustor 58 and retort 10, steam at a temperature of e.g., 250°–300° F, is injected via line 84 into the top portion of the spent shale bed in combustor 58 at a constant rate determined by the setting of flow recorder controller 86 and valve 88. The rate of steam injection should be greater than the difference between M and $m$, and is preferably about 2 to 10 times said difference. This will ordinarily amount to about 200–800 SCF/ton of raw shale. Due to the operation of the various flow controls maintained in the process, a portion of the steam always flows downwardly into combustor 58 and is withdrawn via line 66, while the remainder thereof passes upwardly into transfer conduit 56, forming an effective seal while at the same time stripping a considerable portion of hydrocarbons from the retorted shale.

At some point in transfer conduit 56, a mixture of hot gases is withdrawn via line 90 at a constant rate determined by the setting of flow recorder controller 92 and valve 94. The setting of flow recorder controller 92 is such that the mixed gases in line 90 will always comprise the net retort make gas not withdrawn from the system via line 42, plus some of the steam injected via line 84. To assure this result the gas rate through valve 94 must be greater than M − $x$, is the rate of gas withdrawal through valve 44, but less than $y + m - x$, where $y$ is the rate of steam injection via line 84. In order to assure maximum stability of the system, it is preferred that the rate of gas withdrawal through valve 94 should be at least about 20% greater than $M - x$, and at least about 20% less than $y + m - x$. Total net make gas from lines 90 and 42 is withdrawn from the system via line 96.

The following example is cited to illustrate the invention, but is not to be construed as limiting in scope.

EXAMPLE

Into a retorting system similar to that illustrated in the drawing, is fed 10,000 tons/day of ½inch-2 inches mean diameter crushed shale having a Fischer assay varying between about 34 and 38 gallons per ton. Recycle gas is pumped into the top of the retort at the rate of about 13,700 SCF per ton of shale, and at a pressure of 14 psig. Under these conditions, it is found that the total net make gas produced from scrubber 38 at 115° F and 8 psig varies between about 760 and 840 SCF per ton of raw shale.

In order to maintain a reliable, flow-controlled seal between the retorting zone and the combustion zone, steam at about 220° F is injected via line 84 at the rate of 500 SCF per ton of shale. Net make gas at 115° F is withdrawn from the system via valve 44 at a rate of 500 SCF per ton, and a make-gas-steam mixture at 900° F is withdrawn via valve 94 at the rate of 500 SCF per ton. Under these conditions, it will be seen that at the minimum total gas make of 760 SCF per ton, the mixed gases in line 90 will comprise 260 SCF of make gas and 240 SCF of steam per ton, the remaining 260 SCF of steam passing through the combustor. At the maximum total gas make of 840 SCF per ton, the mixed gases in line 90 will comprise 340 SCF of make gas and 160 SCF of steam, the remaining 340 SCF of steam passing through the combustor.

The following claims and their obvious equivalents are believed to define the true scope of the invention.

I claim:

1. In a gas-solids contacting process wherein a moving bed of granular solids is contacted in an enclosed treating zone at elevated temperatures with a stream of non-oxidizing gas to produce a net off-gas therefrom, the rate of production of said net off-gas varying from time to time between a maximum value, M, and a minimum value, $m$, and wherein said solids are transferred from said treating zone through an enclosed transfer zone into an enclosed combustion zone and contacted therein at elevated temperatures with a stream of oxidizing gas, the improved method for preventing the transfer of gases between said treating zone and said combustion zone without the use of mechanical sealing means, which comprises:

(1) continuously detecting the pressure prevailing at some point in said transfer zone;
   (2) maintaining substantially constant pressures in said treating zone and combustion zone by exhausting flue gas from said combustion zone in response to said detected pressure;
   (3) cooling and removing from the process a portion of said net off-gas at a substantially constant predetermined flow rate, $x$, which is less than said value $m$;
   (4) injecting steam into said transfer zone at a substantially constant predetermined flow rate, $y$, which is greater than $M - m$; and
   (5) at a point between said steam injection and said treating zone, withdrawing a mixed gas stream from said transfer zone at a substantially constant, predetermined flow rate, $z$, wherein $z$ is greater than $M - x$, but less than $y + m - x$, whereby said mixed gas stream always comprises the net off-gas not withdrawn at step (3) plus some steam, and whereby some of said steam injected at step (4) always passes through said combustion zone.

2. A process as defined in claim 1 wherein crushed oil shale is retorted in said treating zone, and coke on the resulting retorted shale is burned in said combustion zone.

3. In a shale retorting process wherein:

(a) crushed oil shale is countercurrently contacted with a preheated, substantially oxygen-free eduction gas in a retorting zone to educe therefrom product oil and a hydrocarbonaceous make gas, the rate of production of said make gas varying from time to time between a maximum value, M, and a minimum value, $m$;
   (b) off-gas from said retorting zone is cooled to condense out water and heavy hydrocarbons, and then divided into a net make gas stream and an eduction recycle gas stream; and
   (c) hot, retorted shale from said retorting zone is passed through an enclosed transfer zone into a combustion zone wherein it is contacted with an oxygen-containing combustion gas to burn coke therefrom and produce a hot flue gas;

the improved method for preventing the transfer of gases between said retorting zone and said combustion zone without the use of mechanical sealing means, which comprises:

(1) continuously detecting the pressure prevailing at some point in said transfer zone;
   (2) maintaining substantially constant pressures in said retorting zone and combustion zone by exhausting flue gas from said combustion zone in response to said detected pressure;
   (3) removing from the system net make gas in (b) above at a substantially constant predetermined flow rate, $x$, which is less than said value $m$;
   (4) injecting steam into said transfer zone at a substantially constant predetermined flow rate, $y$, which is greater than $M - m$; and
   (5) at a point between said steam injection and said retorting zone, withdrawing a mixed gas stream from said transfer zone at a substantially constant, predetermined flow rate, $z$, wherein $z$ is greater than $M - x$, but less than $y + m - x$, whereby said mixed gas stream always comprises the net make gas not withdrawn at step (3) plus some steam, and whereby some of said steam injected at step (4) always passes through said combustion zone.

4. A process as defined in claim 3 wherein said combustion gas is contacted with said retorted shale in concurrent flow therewith.

5. A process as defined in claim 3 wherein said oil shale is passed upwardly through said retorting zone, and said retorted shale is passed downwardly through said transfer zone and said combustion zone.

6. A process as defined in claim 5 wherein said retorted shale is passed through said combustion zone and a substantial lower portion of said transfer zone as a compact bed, and wherein said steam is injected below the top of said compact bed so as to effect a substantial stripping of hydrocarbonaceous material therefrom.

7. A process as defined in claim 5 wherein said combustion gas is contacted with said retorted shale in concurrent flow therewith.

8. A process as defined in claim 3 wherein $M - m$ is at least about 5% of $m$.

9. A process as defined in claim 3 wherein said retorting zone, said transfer zone and said combustion zone are maintained at pressures between about $-10$ and 500 psig.

10. A process as defined in claim 9 wherein said oil shale is passed upwardly through said retorting zone, and said retorted shale is passed downwardly through said transfer zone and said combustion zone.

11. A process as defined in claim 10 wherein said combustion gas is contacted with said retorted shale in concurrent flow therewith.

* * * * *